(No Model.) 2 Sheets—Sheet 1.

J. G. MOOMY.
PNEUMATIC TIRE.

No. 518,850. Patented Apr. 24, 1894.

Witnesses
Inventor
Joseph G. Moomy
By Attorneys
Hallock & Hallock

THE NATIONAL LITHOGRAPHING COMPANY,
WASHINGTON, D. C.

(No Model.) 2 Sheets—Sheet 2.

J. G. MOOMY.
PNEUMATIC TIRE.

No. 518,850. Patented Apr. 24, 1894.

Witnesses
Wm Marks Jr.
H Caird

Inventor
Joseph G. Moomy
By Attorneys
Hallock & Halleck

UNITED STATES PATENT OFFICE.

JOSEPH G. MOOMY, OF ERIE, PENNSYLVANIA.

PNEUMATIC TIRE.

SPECIFICATION forming part of Letters Patent No. 518,850, dated April 24, 1894.

Application filed November 20, 1893. Serial No. 491,465. (No model.)

*To all whom it may concern:*

Be it known that I, JOSEPH G. MOOMY, a citizen of the United States, residing at Erie, in the county of Erie and State of Pennsylvania, have invented certain new and useful Improvements in Pneumatic Tires; and I do hereby declare the following to be a full, clear, and exact description of the invention, such as will enable others skilled in the art to which it appertains to make and use the same.

This invention relates to pneumatic tires, and consists in certain improvements in the construction thereof, as will be hereinafter fully described and pointed out in the claims.

More particularly the invention relates to that class of tires having flaps which contact with the rim and on which are placed annular binders which bind the tire by circumferential strain to the rim.

Figure 1:
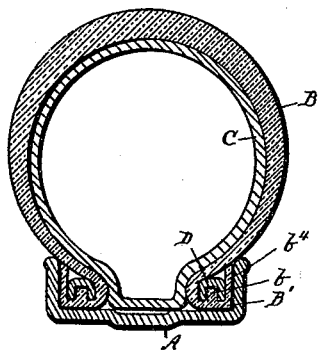
Figure 2:
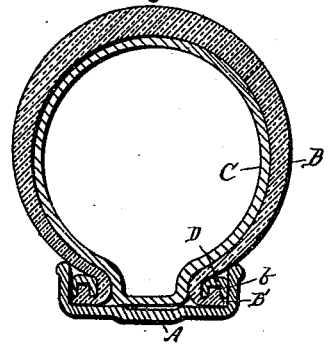
Figure 3:
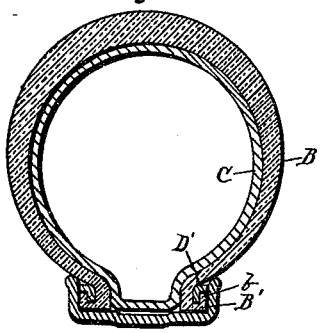
Figure 5:
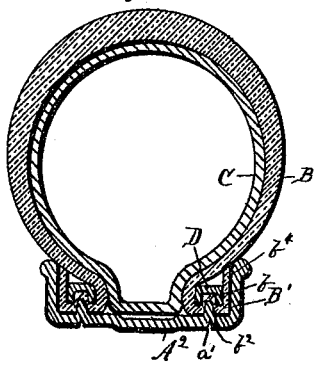
Figure 4:
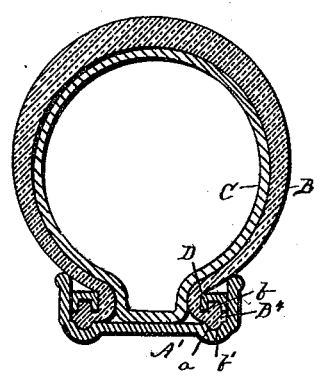
Figure 6:
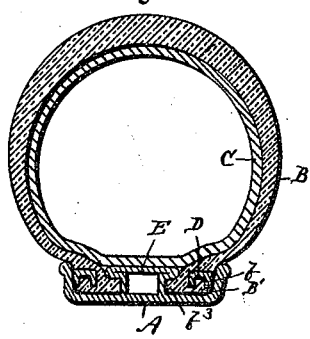
Figure 7:
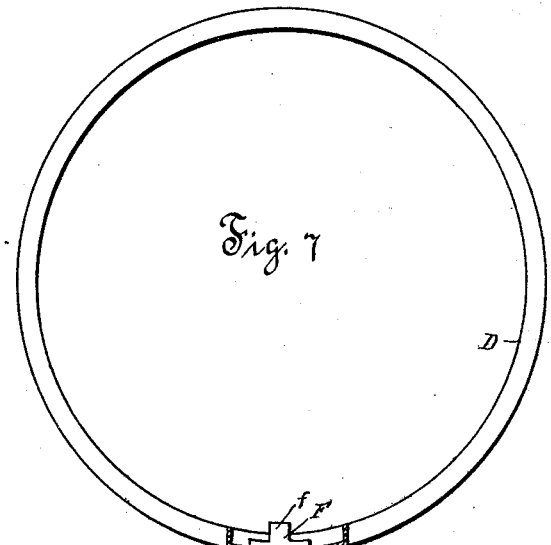
Figure 10:
Figure 9:
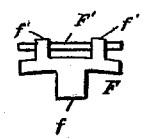
Figure 8:
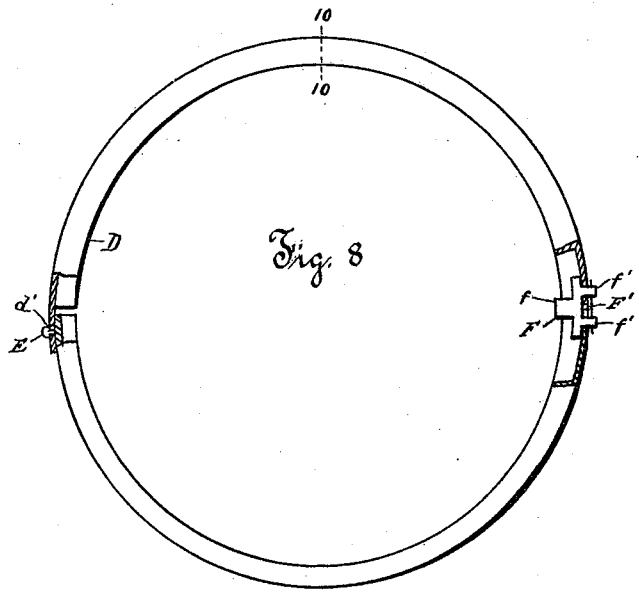

The invention is illustrated in the accompanying drawings as follows:

Figure 1 shows a transverse section of the tire rim and binder of my construction. Fig. 2 is a like view but having an alternative binder flap. Fig. 3 is a like view but showing an alternative binder. Fig. 4 is a like view showing an alternative construction of binder flap and wheel rim. Fig. 5 is a like view showing a construction alternative to Fig. 4. Fig. 6 is a like view of the tire having additional features to that shown in preceding figures. Fig. 7 is a side elevation of the binder showing method of fastening. Fig. 8 is a like view showing at its left sides an alternative method of fastening. Fig. 9 is an enlarged view of the fastening shown in Fig. 7.

A marks the rim of the wheel except in Figs. 4 and 5 where it is designated A' and A² respectively; B the casing of the tire; C the air tube; and D the binder except in Fig. 3 where it is designated by D'.

In all tires where a binder is placed on a flap on the tire in order to bind by circumferential strain the tire to the rim, there is a tendency when the tire is inflated for the binder to be rolled off the flap, or in other words, for the flap to be pulled out from under the binder. To obviate the result of this tendency, is the object of my invention.

In my construction the casing has the outwardly turned flaps on which are the angularly shaped ribs $b$. Over the rib $b$, I place the binder annulus D. which fits over and is strained circumferentially on the top of the rib $b$ and has flanges down over the sides of the rib, the essential features of the binder being that it has an angular shape in cross section with one side extending down on the inner edge of the rib and the other on the top of it as shown in Fig. 3. By so making the binder, it has much greater torsional strength than a flat band has, and the inner flange of the binder hooking down over the rib makes the binder in effect a removable clincher, from which it is impossible for the flap to be withdrawn. The torsional strength of the binder may be increased by giving the binder an outer downwardly extending flange as shown in Fig. 1.

In Figs. 1 and 5 the flap is extended outside the outer flange and upwardly making a second rib on the flap thus strengthening the flap against lateral movement under the binder.

In Fig. 4 the rim has an annular groove or corrugation $a$, into which fits a rib $b'$ on the under side of the flap. This construction clinches the lower part of the flap in place and makes it impossible for it to roll out from under the binder. An alternative construction containing this feature is shown in Fig. 5. In this construction there is an annular rib $a'$ on the rim and a groove $b^2$ in the bottom of the flap which fits the rib.

In Fig. 6 the tendency of the flap to roll is obviated by a centrally located "T" shaped annulus E the flaps of which rest on an outwardly extending flap $b^3$. This "T" shaped annulus is here shown in connection with the annular bandbinder but is not claimed in this application as it forms the subject matter of a separate application.

In Fig. 7 a fastener F is shown; it consists of the stud $f$, which is attached to the rim; outwardly projecting perforated studs $f'$ $f'$ over which the ends of the binder are placed by means of the perforations $d$ $d$. The pin F' is then passed through the perforations in the studs $f'$ $f'$ thus locking the binder in place. In the construction shown in Fig. 7 it is necessary to spring the binder sufficiently to allow the inner flange to pass over the flange on the rim of the wheel and the rib on the flap. In Fig. 8 this springing is obviated by placing a connection or hinge on the binder opposite the fastener F. In the construction shown there is a stud E on one end of the binder over which the other end of the binder is placed by means of the perforation $d'$. This allows the binder to be put on in sections.

Fig. 9 shows an enlarged view of the fastener F as hereinbefore described.

What I claim as new is—

1. In a pneumatic tire, the combination with the rim of the wheel, of the tire having an outwardly turned flap that contacts the outer surface of said rim, and has an annular rib on its upper side, and a flanged binder strained circumferentially on said flap and on said rib thereby binding said flap to said surface of the rim for the purposes set forth.

2. In a pneumatic tire, the combination with the rim of the wheel, of the tire having an outwardly turned flap that contacts the outer surface of said rim and has an annular rib on its upper side, and a double flanged binder that fits over said rib and is strained circumferentially thereon thereby binding said flap to said surface.

3. In a pneumatic tire the combination with the rim of the wheel having an annular groove therein; of the tire having an outwardly turned flap which has an annular rib on its under side which fits into the groove in the outer surface of the rim and also an annular rib on its upper side, and a flanged binder that is strained circumferentially on said flap upon said upper rib.

4. The combination with a tire binder having perforations, $d\ d$, at the ends thereof; of fastener plate having perforated studs $f'\ f'$ thereon which are passed through said perforations in the binder, and a locking pin $F'$ passed through the perforations in the studs.

In testimony whereof I affix my signature in presence of two witnesses.

JOSEPH G. MOOMY.

Witnesses:
HENRY A. CLARK,
H. C. LORD.